United States Patent

[11] 3,626,347

[72] Inventors Victor Lawford
Pasadena;
Richard P. Granada, Covina; Art M. D. Moen, Covina, all of Calif.
[21] Appl. No. 832,206
[22] Filed June 11, 1969
[45] Patented Dec. 7, 1971
[73] Assignee International Telephone and Telegraph Corporation
New York, N.Y.

[54] FUNCTION GENERATOR COMPRISING A CAM-OPERATED LEAF SPRING WITH STRAIN GAUGES
5 Claims, 3 Drawing Figs.

[52] U.S. Cl. .................................................. 338/4, 338/36
[51] Int. Cl. ................................................... G01l 1/22
[50] Field of Search............................................ 235/179, 197, 186, 189, 193.5; 338/6, 13, 2, 4, 5, 36; 74/567, 568; 73/88; 318/20.160

[56] References Cited
UNITED STATES PATENTS

| 2,561,140 | 7/1951 | Schaefer........................ | 235/197 |
| 2,679,013 | 5/1954 | Barnes........................... | 235/197 |
| 2,788,477 | 4/1957 | MacKay ....................... | 318/20.160 UX |
| 2,858,071 | 10/1958 | Stokes............................ | 235/179 |
| 3,048,769 | 8/1962 | Cunningham et al......... | 235/197 X |
| 3,238,532 | 3/1966 | Michel, Jr. et al. ........... | 235/179 X |
| 2,546,155 | 3/1951 | Haber et al. .................. | 338/5 UX |
| 2,992,559 | 7/1961 | Martz et al.................... | 235/193.5 UX |

*Primary Examiner*—Joseph F. Ruggiero
*Attorneys*—C. Cornell Remsen, Jr., Walter J. Baum, Paul W. Hemminger, Percy P. Lantzy and Thomas E. Kristofferson ABSTRACT: The invention includes a cantilever leaf spring having strain gauges thereon. The leaf spring is bent by a cam. By using a cam of a particular configuration, the output of the strain gauges may be modified to represent any desired function of the cam angle. The leaf spring is mounted on a base which may be rotated to vary the spring deflection for a zero adjustment.

PATENTED DEC 7 1971 3,626,347
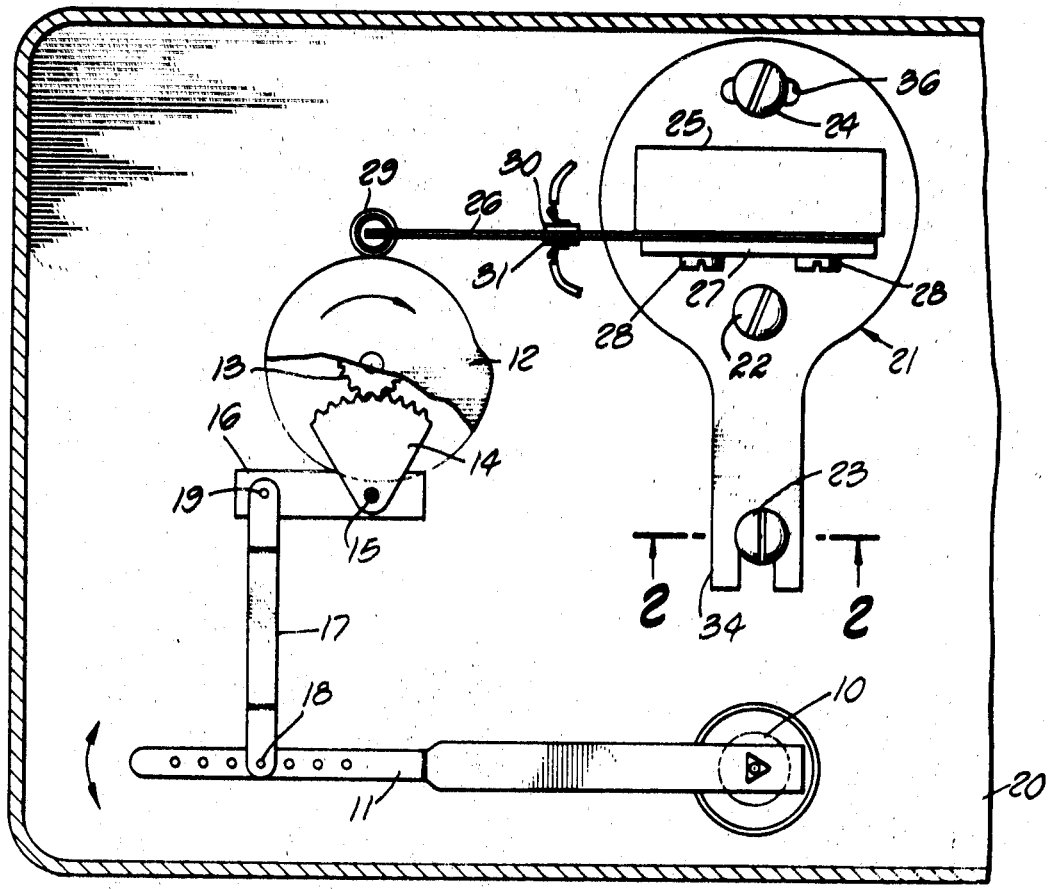
FIG. 1.
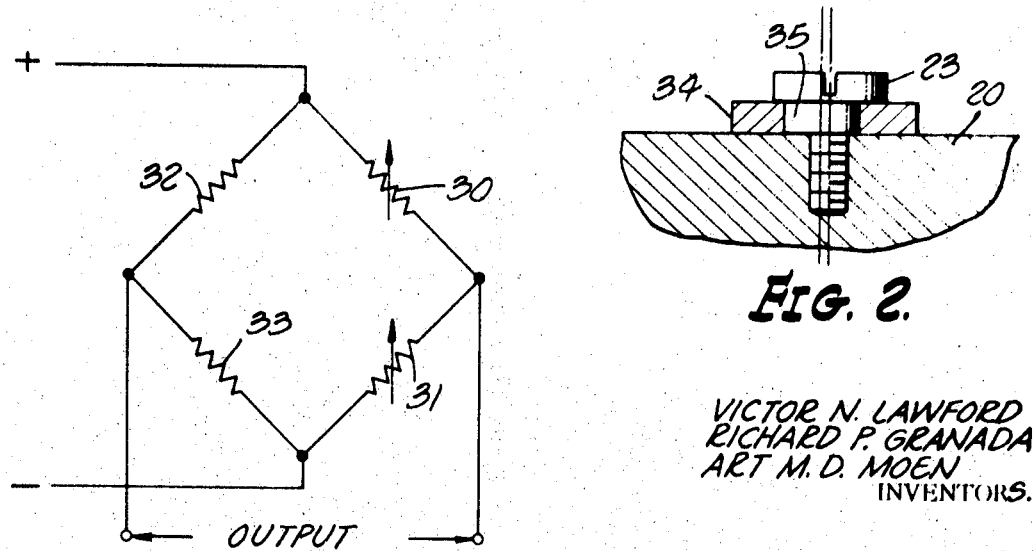
FIG. 2.
FIG. 3.
VICTOR N. LAWFORD
RICHARD P. GRANADA
ART M. D. MOEN
INVENTORS.
BY *Harold Stry*
ATTORNEY 3,626,347

FUNCTION GENERATOR COMPRISING A CAM-OPERATED LEAF SPRING WITH STRAIN GAUGES

BACKGROUND OF THE INVENTION

This invention relates to analog computers and, more particularly, to a function generator.

In the past, a cam-operated leaf spring has been employed with strain gauges to act as a transducer. For example, see U.S. Pat. No. 2,712,645. However, no such devices have ever been used as function generators nor with any zero adjustment.

SUMMARY OF THE INVENTION

In accordance with the device of the present invention, the above-described and other disadvantages of the prior art are overcome by providing a cam-operated leaf spring with strain gauges. However, the cam has a configuration such that strain gauges fixed thereto provide a nonlinear output as a function of cam position. Further, a zero adjustment is provided.

The above-described and other advantages of the invention will be better understood from the following description when considered in connection with the accompanying drawing.

BRIEF DESCRIPTION OF THE DRAWING

In the drawing, which is to be regarded as merely illustrative:

FIG. 1 is a top plan view, partly in section, of the function generator of the present invention;

FIG. 2 is a sectional view of the device taken on the line 2—2 shown in FIG. 1; and FIG. 3 is a schematic diagram of the strain gauge bridge.

DESCRIPTION OF THE PREFERRED EMBODIMENT

In FIG. 1, the output shaft 10 of a conventional differential pressure unit is fixed to an arm 11. Rotation of arm 11 with shaft 10 causes a cam 12 to rotate. Cam 12 has a pinion 13 fixed thereto. A sector gear 14 lies in mesh with pinion 13. Sector gear 14 pivots at 15. Sector gear 14 has an arm 16 fixed thereto. Arms 11 and 16 are connected by a linkage 17 pinned to arms 11 and 16 at 18 and 19, respectively.

All of the structures shown in FIG. 1 are mounted on a table 20.

A base 21 is pivoted about a cap screw 22. Cap screws 23 and 24 also hold base 21 on table 20. Base 21 has a block 25 fixed thereto. One end of cantilever leaf spring 26 is fixed to block 25 held there by a plate 27 and screws 28. A free end of spring 26 has a roller 29 rotatable thereon against the surface of cam 12. Strain gauges 30 and 31 are fixed to opposite sides of spring 26.

Strain gauges 30 and 31 are connected with resistors 32 and 33 in a bridge as shown in FIG. 3.

A zero adjustment is provided including a screw 23. Note will be taken in FIGS. 1 and 2 that base 21 has a fork portion 34 which extends around a cam 35 fixed to screw 23, but eccentric therewith. Thus, by rotating screw 23, base 21 may be rotated about screw 22; and the deflection of spring 26 may be adjusted. Base 21 has a slot 36 so that base 21 can slide under the head of screw 24.

As shown, the output of the bridge shown in FIG. 3 is proportional to the square root of the angle through which arm 11 passes. However, by changing the shape of the cam surface of the cam 12, the output of the bridge may be made proportional to any function of the angle through which arm 11 moves.

The output of the bridge of FIG. 3 is a linear function of the rise of cam 12. However, the cam 12, itself, is nonlinear.

The rise, $r$, of cam 12 is $$r = r_m \times \sqrt{\theta/\theta_m}$$

where $r_m$ is the maximum rise, $\theta$ is the angle through which cam 11 moves, and $\theta_m = \theta$ when $r = r_m$.

Thus, if $r_m = 0.080$ inches and $\theta_m = 8°$, then

| $\theta$ in degrees | $r$ in inches |
| --- | --- |
| 0 | 0 |
| 1 | 0.028 |
| 2 | 0.040 |
| 3 | 0.049 |
| 4 | 0.057 |
| 5 | 0.063 |
| 6 | 0.069 |
| 7 | 0.075 |
| 8 | 0.080 |

The value of $r_m$ is determined by the maximum deflection which spring 26 will safely take. $\theta_m$ preferably is 8° because a differential pressure indication is approximately linear up to 8°. $r_m = 0.080$ inches is a typical, preferred value. Preferably, cam 12 moves through an angle of 20° per 1° rotation of arm 11.

As stated previously, the curvature of cam 12 may be changed. For example, it may be changed to a linear, cube root or other function. It also may be custom fit, for example, when the differential pressure unit is employed to indicate the total volume of fluid remaining in an odd-shaped tank or reservoir.

What is claimed is:

1. A function generator comprising: a cantilever leaf spring; a table; a base movable on said table; means holding one end of said spring fixed to said base; a roller rotatable at the free end of said spring; a main cam engageable with said roller; means mounted on said table to rotate said main cam; a strain gauge winding fixed to opposite sides of said spring between the ends thereof; and means mounted on said table for adjusting the position of said base to vary the deflection of said spring.

2. The invention as defined in claim 1, wherein said adjustment means includes a cap screw having an eccentric cam therearound, said base having a radial fork straddling said eccentric cam, said base being pivoted on said table at a point spaced from said screw.

3. The invention as defined in claim 2, wherein said means to rotate said main cam includes a sector gear, a lever fixed to said sector gear, a pinion in mesh with said sector gear, said pinion being fixed to said main cam, an input arm, and a linkage pinned between said arm and said lever.

4. The invention as defined in claim 4, wherein said main cam has a rise, $r$, given by the formula, $$r = r_m \times \sqrt{\theta/\theta_m}$$

where $r_m$ is the maximum rise of said main cam, $\theta$ is the angle through which said input arm moves, and $\theta_m = \theta$ when $r = r_m$.

5. A function generator comprising: a cantilever leaf spring; a table; mounting means to hold one end of said spring in a fixed position relative to said table; a main cam, said spring having a free end engageable with said cam; means to rotate said main cam; a strain gauge winding fixed to at least one side of said spring between said free end thereof and said fixed end thereof, said mounting means including a base movable on said table, said fixed spring end being fixed to said base; and means for adjusting the position of said base to vary the deflection of said spring.

* * * * *